US011030345B2

(12) United States Patent
Barrett et al.

(10) Patent No.: US 11,030,345 B2
(45) Date of Patent: Jun. 8, 2021

(54) SHARING REGULATED CONTENT STORED ON NON-REGULATED STORAGE PLATFORMS

(71) Applicant: MEDIDATA SOLUTIONS, INC., New York, NY (US)

(72) Inventors: Kevin Anthony Barrett, Los Altos, CA (US); Patrick Michael Pollard, Los Altos, CA (US); Patrick Roberts, Danville, CA (US); Martin Frid-Nielsen, Menlo Park, CA (US)

(73) Assignee: Medidata Solutions, Inc., New York, NY (US)

( * ) Notice: Subject to any disclaimer, the term of this patent is extended or adjusted under 35 U.S.C. 154(b) by 88 days.

(21) Appl. No.: 16/584,682

(22) Filed: Sep. 26, 2019

(65) Prior Publication Data

US 2020/0026880 A1    Jan. 23, 2020

Related U.S. Application Data

(63) Continuation of application No. 15/230,142, filed on Aug. 5, 2016, now Pat. No. 10,467,436.

(Continued)

(51) Int. Cl.
*H04L 29/06* (2006.01)
*G06F 21/64* (2013.01)
*G06F 16/23* (2019.01)

(52) U.S. Cl.
CPC .......... *G06F 21/64* (2013.01); *G06F 16/2365* (2019.01); *H04L 63/10* (2013.01); *H04L 63/123* (2013.01)

(58) Field of Classification Search
CPC ... H04L 63/10; H04L 63/123; G06F 16/2365; G06F 21/64–645

(Continued)

(56) References Cited

U.S. PATENT DOCUMENTS 7,676,835 B2    3/2010 Brannon et al.
8,671,132 B2    3/2014 Carlson
(Continued)

OTHER PUBLICATIONS

PCT International Search Report and Written Opinion for PCT/US16/45920, dated Oct. 21, 2016, 11 Pages.
(Continued)

*Primary Examiner* — Matthew T Henning
(74) *Attorney, Agent, or Firm* — Steptoe & Johnson LLP; Robert Greenfeld (57) ABSTRACT

Methods and systems of storing and managing regulated content items on a non-regulated storage platform are provided. A representation of a regulated content item representing content of the regulated content item is created. The content of the regulated content item is subject to one or more regulations and the regulated content item is stored on the non-regulated storage platform. The representation of the regulated content item is provided to the non-regulated storage platform for storage. The representation of the regulated content item is configured to be accessible on the non-regulated storage platform. A request to access the regulated content item using the representation of the regulated content item is received. The regulated content item is retrieved from the non-regulated storage platform in response to the received request.

20 Claims, 9 Drawing Sheets

Related U.S. Application Data (60) Provisional application No. 62/201,498, filed on Aug. 5, 2015, provisional application No. 62/276,224, filed on Jan. 7, 2016.

(58) Field of Classification Search
USPC .......................................................... 726/4
See application file for complete search history.

(56) References Cited

U.S. PATENT DOCUMENTS

| | | |
|---|---|---|
| 8,726,396 B1 | 5/2014 | Dodke |
| 10,148,992 B2 | 12/2018 | Sarosi et al. |
| 2002/0083341 A1* | 6/2002 | Feuerstein .............. G06F 21/55 726/25 |
| 2003/0093518 A1 | 5/2003 | Hiraga |
| 2004/0059939 A1 | 3/2004 | de Jong |
| 2004/0181598 A1 | 9/2004 | Paya et al. |
| 2004/0260414 A1 | 12/2004 | Barringer et al. |
| 2005/0154908 A1 | 7/2005 | Okamoto |
| 2006/0184764 A1 | 8/2006 | Osaki |
| 2007/0220593 A1 | 9/2007 | Burakoff et al. |
| 2008/0243878 A1 | 10/2008 | de Spiegeleer et al. |
| 2009/0164790 A1* | 6/2009 | Pogodin .................. G06F 21/64 713/176 |
| 2010/0161993 A1 | 6/2010 | Mayer |
| 2010/0313117 A1 | 12/2010 | Fukasawa |
| 2011/0184910 A1 | 7/2011 | Love et al. |
| 2012/0273568 A1 | 11/2012 | Dlott et al. |
| 2012/0297191 A1* | 11/2012 | Johnson .............. G06F 12/1408 713/168 |
| 2016/0188579 A1 | 6/2016 | Veit |
| 2018/0129568 A1 | 5/2018 | Kapoor |

OTHER PUBLICATIONS

United States Office Action, U.S. Appl. No. 15/230,142, dated Apr. 19, 2019, 11 pages.

United States Office action, U.S. Appl. No. 15/230,142, dated Feb. 8, 2019, 9 pages.

* cited by examiner

SHARING REGULATED CONTENT STORED ON NON-REGULATED STORAGE PLATFORMS

CROSS REFERENCE TO RELATED APPLICATION(S)

This application is a Continuation of U.S. patent application Ser. No. 15/230,142, filed Aug. 5, 2016, which claims priority under 35 U.S.C. § 119(e) to U.S. Provisional Patent Application Ser. No. 62/201,498, "Content Integrity Verification for Regulated Content Stored on a Non-regulated Content Platform," filed Aug. 5, 2015 and U.S. Provisional Patent Application Ser. No. 62/276,224, "Systems and Methods for Sharing Content Between Non-regulated and Regulated Platforms," filed Jan. 7, 2016. The subject matter of each of the foregoing is incorporated herein by reference in its respective entirety.

BACKGROUND

Field of Disclosure

This application relates generally to managing regulated content (e.g., FDA regulated content) on non-regulated storage platforms. In particular, the application relates to sharing regulated content stored on non-regulated storage platforms.

Description of the Related Art

Today, regulated content such as FDA regulated documents and files, are heavily regulated, including specific regulations around how such documents can be stored and how they can be accessed by users within an organization. This regulated content is typically required to be stored on validated systems in order to meet all of these regulations. This limits the ability of organizations to store their regulated content, and often requires expensive subscriptions by these organizations to regulated storage services that have gone through the procedures to meet and maintain their ability to store regulated content. These regulated storage platforms are more limited in storage capacity and capability, and are commonly a high expense for organizations for regulated content. Typically, cloud content management services or public cloud storage platforms are not validated to meet various requirements such as data integrity, data control, change and release management, and user acceptance testing requirements imposed by FDA regulations. Accordingly, while these non-regulated storage platforms are easy to use, often free, and provide a large amount of storage capacity, these storage platforms cannot be used for managing regulated documents and files.

Another inconvenience for companies with regulated content is that these companies often have to use multiple storage platforms for managing regulated and non-regulated content to meet their business needs and to comply with regulations. This is because specialized regulated document management systems are not designed for managing non-regulated business content and are typically not economically viable for managing both types of content. Managing multiple storage platforms can increase operational costs and reduce operational efficiency. Using multiple storage platforms to manage regulated and non-regulated content can impede company-wide collaboration and may also prevent the companies from viewing content from a holistic perspective as distinct from a functional or process perspective.

SUMMARY

One embodiment of the computer-implemented method for storing and managing regulated content items on a non-regulated storage platform includes creating a representation of a regulated content item representing content of the regulated content item. The content of the regulated content item is subject to one or more regulations and the regulated content item is stored on the non-regulated storage platform. The computer-implemented method provides the representation of the regulated content item to the non-regulated storage platform for storage. The representation of the regulated content item is configured to be accessible on the non-regulated storage platform. The computer-implemented method receives a request to access the regulated content item using the representation of the regulated content item. The computer-implemented method retrieves the regulated content item from the non-regulated storage platform in response to the received request.

One embodiment of a non-transitory computer-readable storage medium storing executable computer program instructions for storing and managing regulated content items on a non-regulated storage platform includes instructions for creating a representation of a regulated content item representing content of the regulated content item. The content of the regulated content item is subject to one or more regulations and the regulated content item is stored on the non-regulated storage platform. The computer program instructions include instructions for providing the representation of the regulated content item to the non-regulated storage platform for storage. The representation of the regulated content item is configured to be accessible on the non-regulated storage platform. The computer program instructions include instructions for receiving a request to access the regulated content item using the representation of the regulated content item. The computer program instructions include instructions for retrieving the regulated content item from the non-regulated storage platform in response to the received request.

One embodiment of a system for storing and managing regulated content items, comprises a processor for executing computer program instructions and a non-transitory computer-readable storage medium comprising computer program instructions executable by the processor. The computer program instructions comprise instructions for creating a representation of a regulated content item representing content of the regulated content item. The content of the regulated content item is subject to one or more regulations and the regulated content item is stored on the non-regulated storage platform. The computer program instructions include instructions for providing the representation of the regulated content item to the non-regulated storage platform for storage. The representation of the regulated content item is configured to be accessible on the non-regulated storage platform. The computer program instructions include instructions for receiving a request to access the regulated content item using the representation of the regulated content item. The computer program instructions include instructions for retrieving the regulated content item from the non-regulated storage platform in response to the received request.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
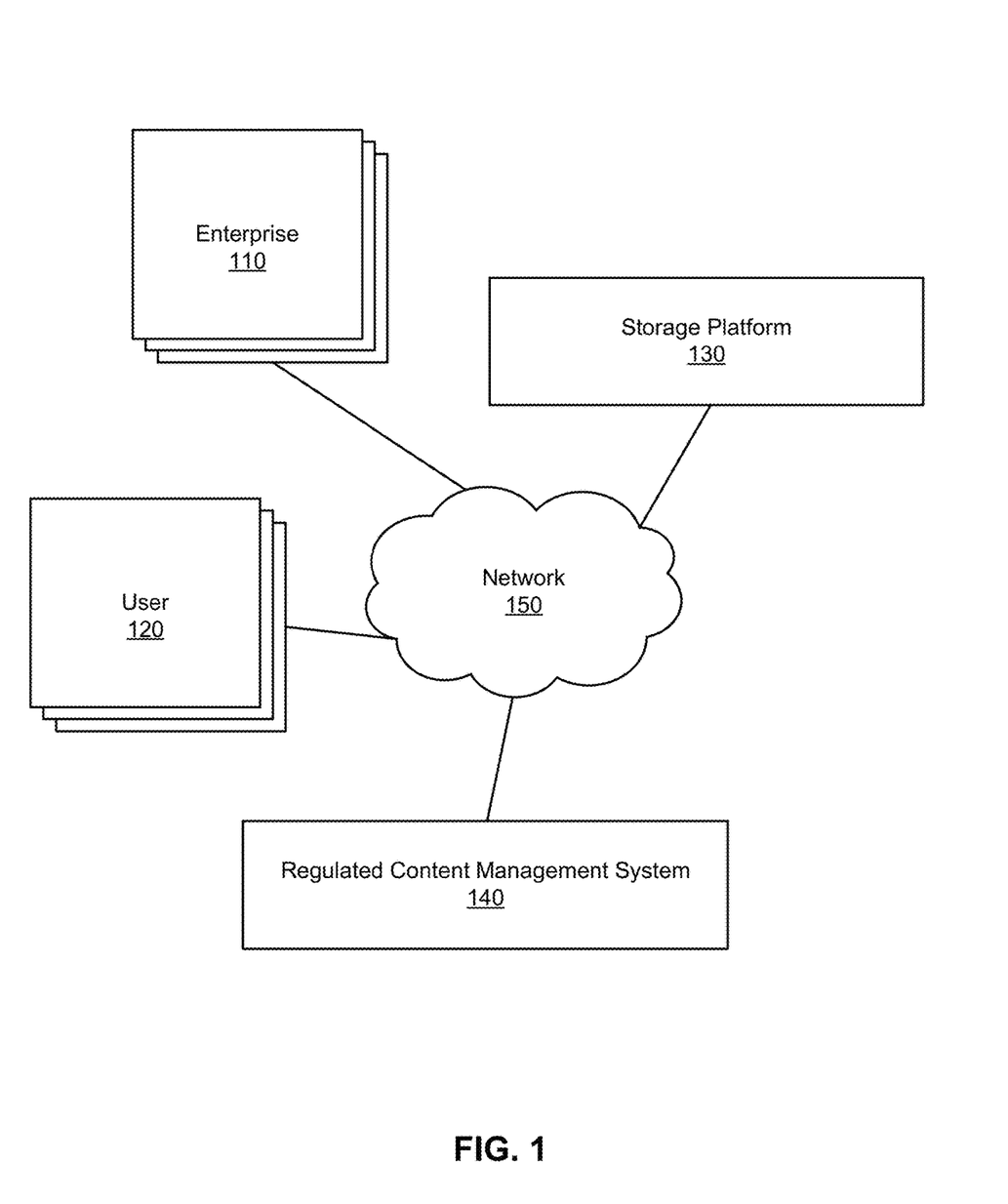
FIG. 1 illustrates a computing environment for managing regulated content, according to an embodiment.

FIG. 1 illustrates a computing environment 100 for managing regulated content, according to an embodiment. The environment includes entities such as enterprises 110, users 120, a storage platform 130, a regulated content management system 140, and a network 150. The network 150 connects the enterprises 110, the users 120, the storage platform 130 and the regulated content management system 140. In the illustrated example, only one storage platform and only one regulated content management system are shown, but there may be multiple instances of the storage platform and multiple instances of the regulate content management system.

The enterprises 110 receive regulated content management services provided by the regulated content management system 140. Examples of enterprises 110 include corporations, organizations, government agencies, universities and the like. In one embodiment throughout the description herein, enterprises include pharmaceutical companies, organizations, and other similar entities. The enterprises 110 and associated users (e.g., employees, officers, contractors, etc.) may interact with the regulated content management 140 in at least the same ways as the users 120 as further described below, for example, through a website hosted by the regulated content management system 140 or via dedicated applications installed on user devices. Enterprises 110 may also interact in different ways. For example, a dedicated enterprise-wide application of the regulated content management system 140 may be installed to facilitate interaction between one or more users 120 that are associated with the enterprises 110 and the regulated content management system 140. Alternately, some or all of the regulated content management system 140 may be hosted by an enterprise 110.

The users 120 receive regulated content management services provided by the regulated content management system 140. The users 120, via various user devices (not shown), create, access, edit, and review regulated content items from the regulated content management system 140. As described herein, regulated content items are electronic files that include regulated content subject to various regulations. That is, creation, modification, maintenance, archive, retrieval, and transmission of regulated content items are required to comply with one or more regulations such as Food and Drug Administration (FDA) regulations. Only particular users are permitted to access regulated content items. Creation, editing, and removal of regulated content items are subject to approval by particular users. Examples of electronic files include Microsoft Word documents, Adobe PDF documents, Microsoft Excel spreadsheets, image files, video files and other file types containing regulated content. As one example, a regulated content item is Standard Operating Procedure of a pharmaceutical company. Creation, modification, maintenance, archive, retrieval, and transmission of regulated content items are required to comply with the regulations, such as the FDA regulations. It is appreciated, however, that in other embodiments, a regulated content item alternatively and/or additionally includes other forms of regulated content subject to other regulations such as financial (e.g., banking), energy (e.g., oil or gas), aviation, construction, and the like.

The users 120 may interact with the regulated content management system 140 by visiting a website hosted by the regulated content management system 140. As an alternative to accessing the regulated content management system 140 through a web browser, the users 120 may download and install a dedicated application of the regulated content management system 140 that is designed to interact with the regulated content management system 140. In various embodiments, multiple users 120 are associated with an enterprise 110. Users 120 associated with an enterprise 110 are employees, officers, contractors, or otherwise associated with the enterprise 110.

User devices of the users 120 are computing devices such as mobile devices (e.g., smartphones or tablets with operating systems such as ANDROID or APPLE IOS), laptop computers, desktop computers, electronic stereos in automobiles or other vehicles, or any other type of network-enabled device that accesses and edits regulated content such as files and documents. A user device typically includes hardware and software to connect to the network 150 (e.g., via Wi-Fi and/or Long Term Evolution (LTE) or other wireless telecommunication standards), and to receive input from the users 120. In addition to enabling a user to interact with regulated content items from the regulated content management system 140, user devices may also provide the regulated content management system 140 with data about the status and use of user devices, such as their network identifiers and geographic locations.

A storage platform 130 provides data storage services. The storage platform 130 stores data for the enterprises 110 and the users 120. For example, the storage platform 130 may be a cloud content management service (e.g., DROPBOX™, BOX™, etc.) or a public cloud storage platform (e.g., AMAZON™, MICROSOFT™, etc.). In addition, the storage platform 130 may be a hosted storage platform infrastructure that the enterprises 110 or the users 120 use to store different content. The storage platform 130 may also be a storage platform infrastructure at an enterprise 110's premise. Enterprises 110 may create enterprise accounts at the storage platform 130. Users 120 may create user accounts at the storage platform 130. The storage platform 130 stores regulated and non-regulated content items for enterprises 110 and users 120. The storage platform 130 may store regulated content items in storage locations (e.g., directories) under a master account for the regulated content management system 140. The storage platform 130 may store non-regulated content items for enterprises 110 and users 120 in storage locations (e.g., directories) under accounts for the enterprises 110 and users 120.

The regulated content management system 140 provides regulated content management services for enterprises 110 and users 120. The regulated content management system 140 validates and maintains content items to comply with regulations for enterprises 110 and users 120. The regulated content management system 140 interacts with the storage platform 130 to create and to control regulated content items. The regulated content management system 140 provides users 120 with accesses to create, to retrieve, to edit, and to approve regulated content items. The regulated content management system 140 validates regulated content items created on the regulated content management system 140 and stored on the storage platform 130. The regulated content management system 140 also validates regulated content items that are brought into the storage platform 130.

The network 150 provides a communication infrastructure between the enterprises 110, the users 120, the storage platform 130, and the regulated content management system 140. In one embodiment, the network 150 uses standard communications technologies and/or protocols and can include the Internet. Thus, the network 150 can include links using technologies such as Ethernet, 802.11, InfiniBand, PCI Express Advanced Switching, etc. Similarly, the networking protocols used on the network 150 can include multiprotocol label switching (MPLS), transmission control protocol/Internet protocol (TCP/IP), User Datagram Protocol (UDP), hypertext transport protocol (HTTP) and secure hypertext transport protocol (HTTPS), simple mail transfer protocol (SMTP), file transfer protocol (FTP), etc. The data exchanged over the network 150 can be represented using technologies and/or formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 150 can use custom and/or dedicated data communications technologies instead of, or in addition to, the ones described above.

Regulated Content Management System

Figure 2:
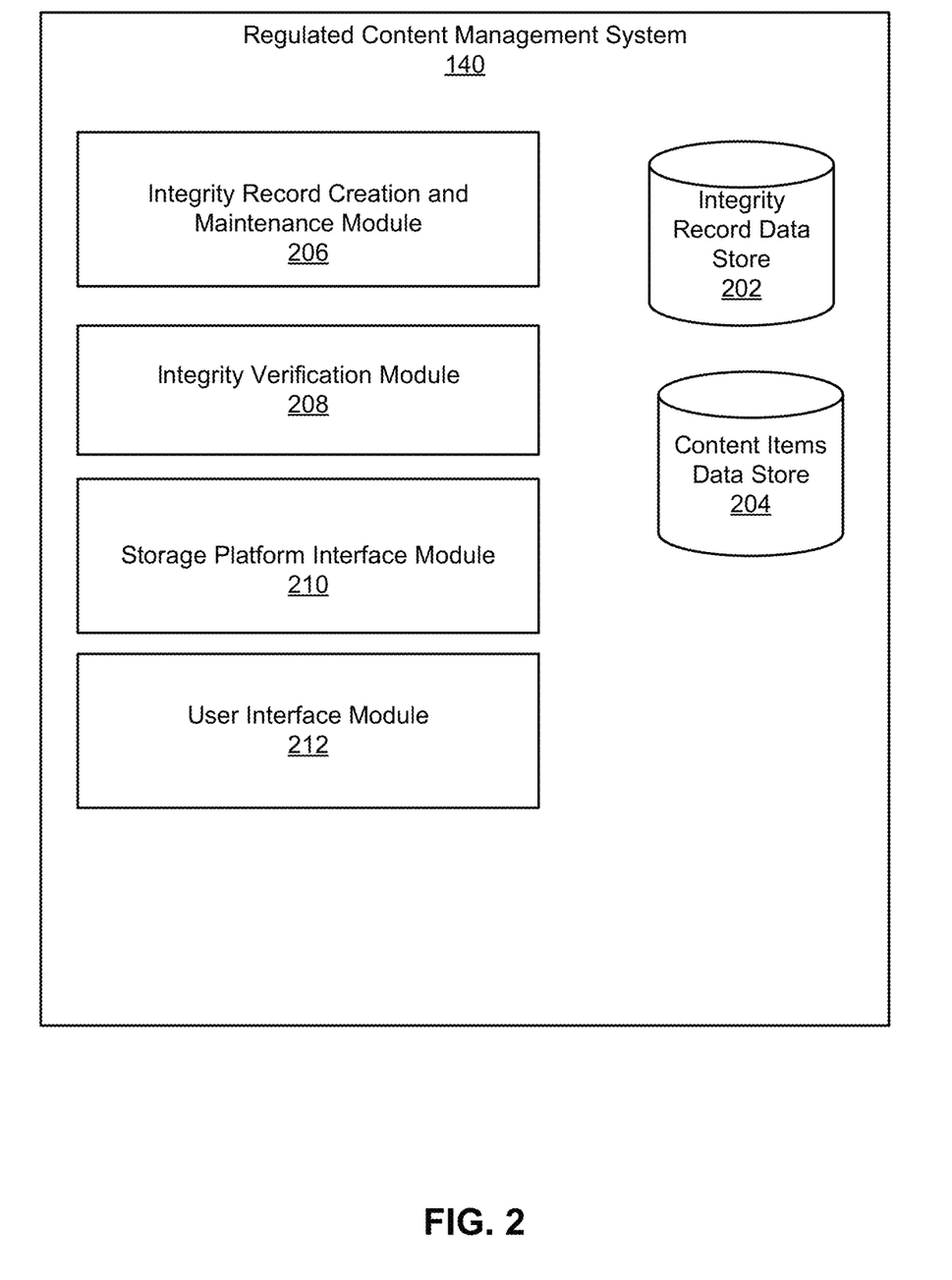
FIG. 2 is a high-level block diagram illustrating a detailed view of modules within an example regulated content management system, according to one embodiment.

The regulated content management system 140 is now described in more detail with respect to FIG. 2. FIG. 2 is a high-level block diagram illustrating a detailed view of modules within an example regulated content management system 140, according to one embodiment. Some embodiments of the regulated content management system 140 have different modules than those described here. Similarly, the functions can be distributed among the modules in a different manner than is described here. The components of the regulated content management system 140 include an integrity record data store 202, a content items data store 204, an integrity record creation and maintenance module 206, an integrity verification module 208, a storage platform interface module 210, and a user interface module 212.

The integrity record data store 202 stores integrity records associated with regulated content items. An integrity record is associated with a regulated content item that is stored on the storage platform 130 and provides integrity information of the particular integrity record. When a copy of a regulated content item stored on the storage platform 130 is retrieved from the storage platform 130, the integrity information can be used to verify whether the content has been modified without being approved since the last review of the integrity record. In other words, the integrity record associated with a regulated content item can be used to verify whether a regulated content item has been modified to any degree while being stored on the storage platform 130. Each integrity record is identified by a content item ID that is unique to the regulated content item. An integrity record includes various metadata associated with a regulated content item, such as a content item name, a storage location in the storage platform 130 where a regulated content item is stored, an integrity check, and other metadata specific to the regulated content item (e.g. Standard Operating Procedure, clinical trial protocol, case report forms, etc.) An integrity check can involve use of a checksum, a cyclic redundancy check (CRC), a digital signature or watermark, and other data verification measures.

The content items data store 204 temporarily stores various copies of regulated content items. For example, the content items data store 204 temporarily stores a copy of a regulated content item when creating the regulated content item and storing the regulated content item in the storage platform 130. As another example, the content items data store 204 temporarily stores a copy of a regulated content item upon retrieving the copy of the regulated content item stored in the storage platform 130.

The integrity record creation and maintenance module 206 creates and maintains integrity records associated with regulated content items. When receiving a request from a user to create a new regulated content item, the integrity record creation and maintenance module 206 creates an integrity record associated with the regulated content item. For example, the integrity record includes metadata of the regulated content item such as the content item ID, content item name, storage location and the like. The integrity record creation and maintenance module 206 may determine a unique value based on the content of the regulated content item. For example, a checksum may be calculated using one or more hash functions such as MD5 algorithm. The integrity record creation and maintenance module 206 further updates the integrity record for the regulated content item. For example, responsive to detecting a change in content in the regulated content item, the integrity record creation and maintenance module 206 updates the integrity check associated with the regulated content item. As another example, responsive to detecting a file name change, the integrity record creation and maintenance module 206 updates the content item name in the integrity record associated with the regulated content item.

The integrity verification module 208 verifies the integrity of regulated content items. The integrity verification module 208 verifies whether a regulated content item stored in the storage platform 130 retains its integrity when being stored in and/or retrieved from the storage platform 130. For example, when receiving a request from a user to create a regulated content item, the integrity verification module 208 verifies the integrity of the regulated content item to ensure that the regulated content item is not modified and complies with FDA regulations during the process of storing the regulated content item into the storage platform 130. As another example, when receiving a request from a user to retrieve a regulated content item, the integrity verification module 208 verifies the integrity of the regulated content item to ensure that the regulated content item is not modified and complies with FDA regulations during the process of retrieving the regulated content item from the storage platform 130.

The storage platform interface module 210 interacts with the storage platform 130 to provide regulated content for storage or to retrieve regulated content from storage. The storage platform interface module 210 receives regulated content items from or provides regulated content items to one or more other modules of the regulated content management system 140. For example, the storage platform interface module 210 visits a storage location of the storage platform 130 to obtain a copy of a regulated content item. The storage platform interface module 210 may provide the obtained copy to the content items data store 204 for storage. The storage platform interface module may also provide the obtained copy to the integrity verification module 208 for analysis. As another example, the storage platform interface module 210 provides a copy of the regulated content item to the user device interface module 212, with which a user device can interact to receive the copy of the regulated content item. The storage platform interface module 210 also obtains storage locations at the storage platform 130 where regulated content items are stored. The storage platform interface module 210 provides the obtained information to other modules of the regulated content management system 140 for use. For example, the storage platform interface module 210 provides a storage location obtained from the storage platform 130 to the integrity record creation and maintenance module 206 for creation of an integrity record.

The client interface module 212 interacts with user devices to provide regulated content items or to receive instructions. For example, the client interface module 212 a regulated content item retrieved from the storage platform to a user device of a user who requested the particular regulated content item. As another example, the client interface module 212 provides a regulated content item to a user device of a user for approval. The client interface module 212 receives various instructions such as a request to create a regulated content item, a request to retrieve a regulated content item, a request to edit a regulated content item, an approval of a regulated content item.

Figure 3A:
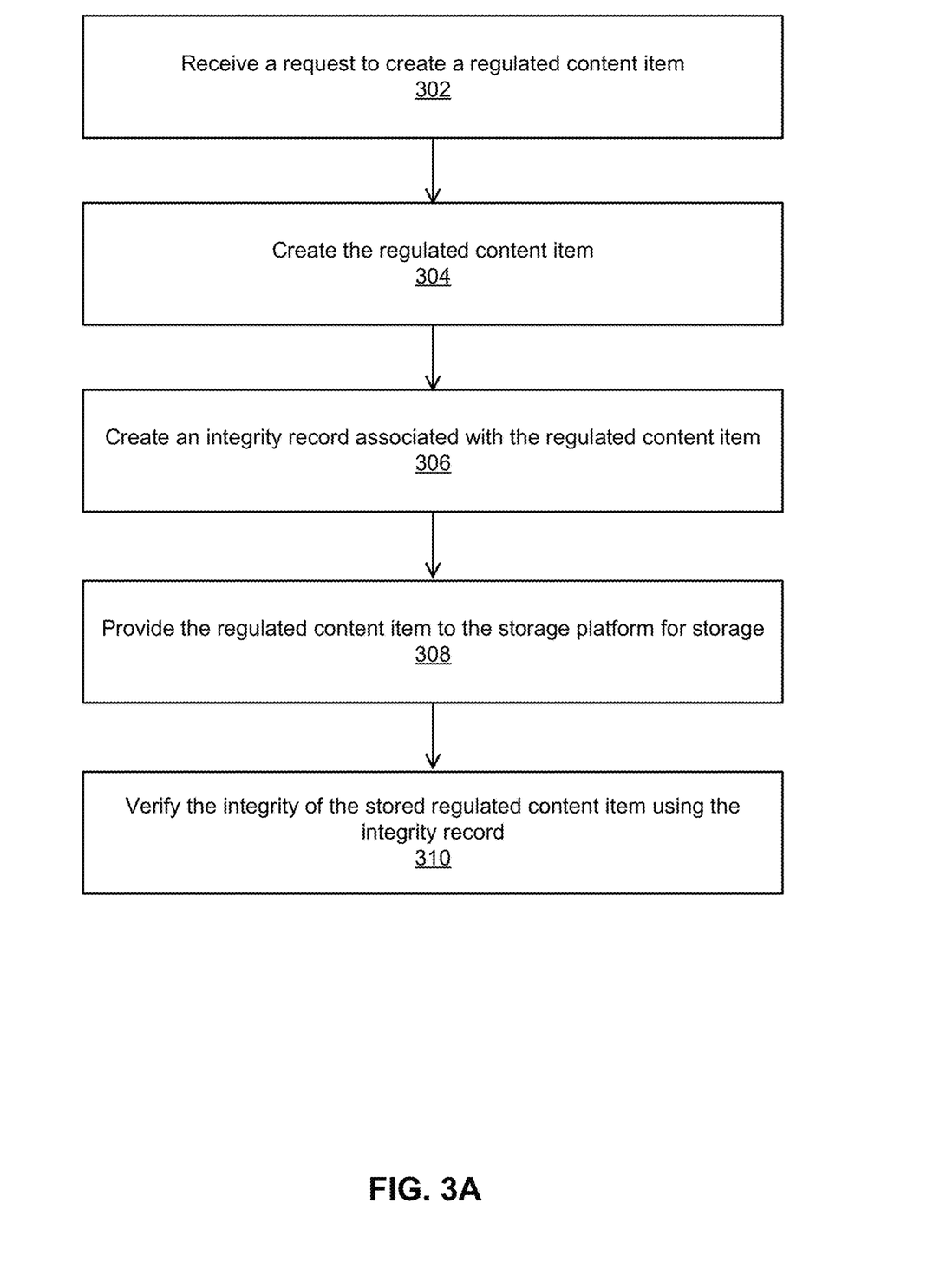
FIG. 3A is a flow chart illustrating an example process of creating and storing a regulated content item, according to one embodiment.

FIG. 3A is a flow chart illustrating an example process of creating and storing a regulated content item, according to one embodiment. In other examples, some steps may not be included, may be modified, or may be in different orders, and the same is true for all flow charts described below. The regulated content management system 140 receives 302 a request to create a regulated content item. As one example, a user may request to create a new regulated content item using a template. As another example, a user may request to upload an existing file to create a new regulated content item using the existing file.

The regulated content management system 140 creates 304 the regulated content item in response to the request. For instance, the regulated content management system 140 may call an application such as text editor (e.g., MICROSOFT WORD™) to create the regulated content item as requested. The regulated content management system 140 provides the created regulated content item to one or more users for approval. The user who creates the content item may identify the one or more users who should approve the created regulated content item. In some cases, the regulated content item management system 140 may determine a list of approvers for the user to choose from based on a type of the created regulate content item and provide the list to the user. The regulated content management system 140 may store a copy of the created regulated content item, for example, temporarily in the content items data store 204.

The regulated content management system 140 creates 306 an integrity record associated with the regulated content item. The integrity record associated with the regulated content item is identified by a unique integrity record ID. The regulated content management system 140 determines an integrity check based on the content of the regulated content item and stores the determined integrity check in the integrity record associated with the regulated content item. The regulated content management system 140 may further store metadata of a regulated content item in the integrity record associated with the regulated content item. Example metadata of a regulated content item includes a file name, storage location, file size, owner, department, document type, and the like.

The regulated content management system 140 provides 308 the regulated content item to the storage platform 130 for storage. The regulated content management system 140 may provide the regulated content item to the storage platform 130 for storage responsive to receiving an approval. In some embodiments, the regulated content management system may generate and provide a representation of the regulated content item as further described with reference to FIGS. 5A-5B. Provision of the regulated content item to the storage platform 130 for storage may be performed periodically while the user is editing the regulated content item, responsive to a user's instruction to save the regulated content item, or responsive to detecting the user has completed editing the regulated content item. The regulated content management system 140 may provide a copy of the regulated content item to the storage platform 130 for storage. The regulated content management system 140 receives a file name and a storage location of the regulated content item from the storage platform 130. For example, the storage platform interface module 210 interacts with the storage platform 130 to obtain the storage location of the regulated content item. The storage location may be a link to a directory where the regulated content item is stored, such as a location of the regulated content item in the folder hierarchy. The file name may be used to identify the storage location of the regulated content item on the storage platform 130. The regulated content management system 140 updates the integrity record created to include the file name and/or storage location of the content item stored on the storage platform 130.

In addition, the regulated content management system 140 synchronizes the copy of the regulated content item that is locally stored on the regulated content management system 140 and the copy of the regulated content item that is stored on the storage platform 130. That is, after the regulated content item is created and stored on the storage platform 130, the user may edit the regulated content item via the regulated content management system 140. The regulated content management system 140 synchronizes the edits between the regulated content management system 140 and the storage platform 130. For example, the storage platform interface module 210 interfaces with an Application Program Interface (API) of the storage platform 130 to synchronize the edits between the two copies.

The regulated content management system 140 verifies 310 the integrity of the regulated content item using the integrity record. Regulated content items may be tampered with when stored on the storage platform 130 by various factors, for example, computer viruses, software bugs, media failures, communication errors, and the like. The regulated content management system 140 retrieves a copy of the regulated content item stored on the storage platform 130. For example, the storage platform interface module 210 can retrieve the copy of the regulated content item using the file name and/or storage location of the regulated content item. The retrieved copy may be stored in the content items data store 204. The regulated content management system 140 determines a second integrity check using the retrieved copy of the regulated content item using the same mechanism used to generate the integrity check of the integrity record associated with the regulated content item.

The regulated content management system 140 compares the determined integrity check to the integrity check of the integrity record associated with the regulated content item. Responsive to determining that the two integrity checks are identical, the regulated content management system 140 confirms the integrity of the regulated content item stored on the storage platform 130. The regulated content management system 140 may remove the copies of the regulated content stored in the content items data store 204. The regulated content management system 140 may further notify the user 120 that the regulated content item is stored successfully on the storage platform 130. Responsive to determining that the two integrity checks are different, the regulated content management 130 determines that the integrity verification of the stored regulated content item has failed. The regulated content management system 140 interacts with the storage platform 130 to prevent the regulated content item stored on the storage platform 130 from being used. The regulated content item may be removed from or locked on the storage platform 130. In addition, the regulated content management system 140 may further remove the copies of the regulated content stored in the content items data store 204. The regulated content management system 140 may notify the user that the regulated content item is not stored successfully.

Figure 3B:
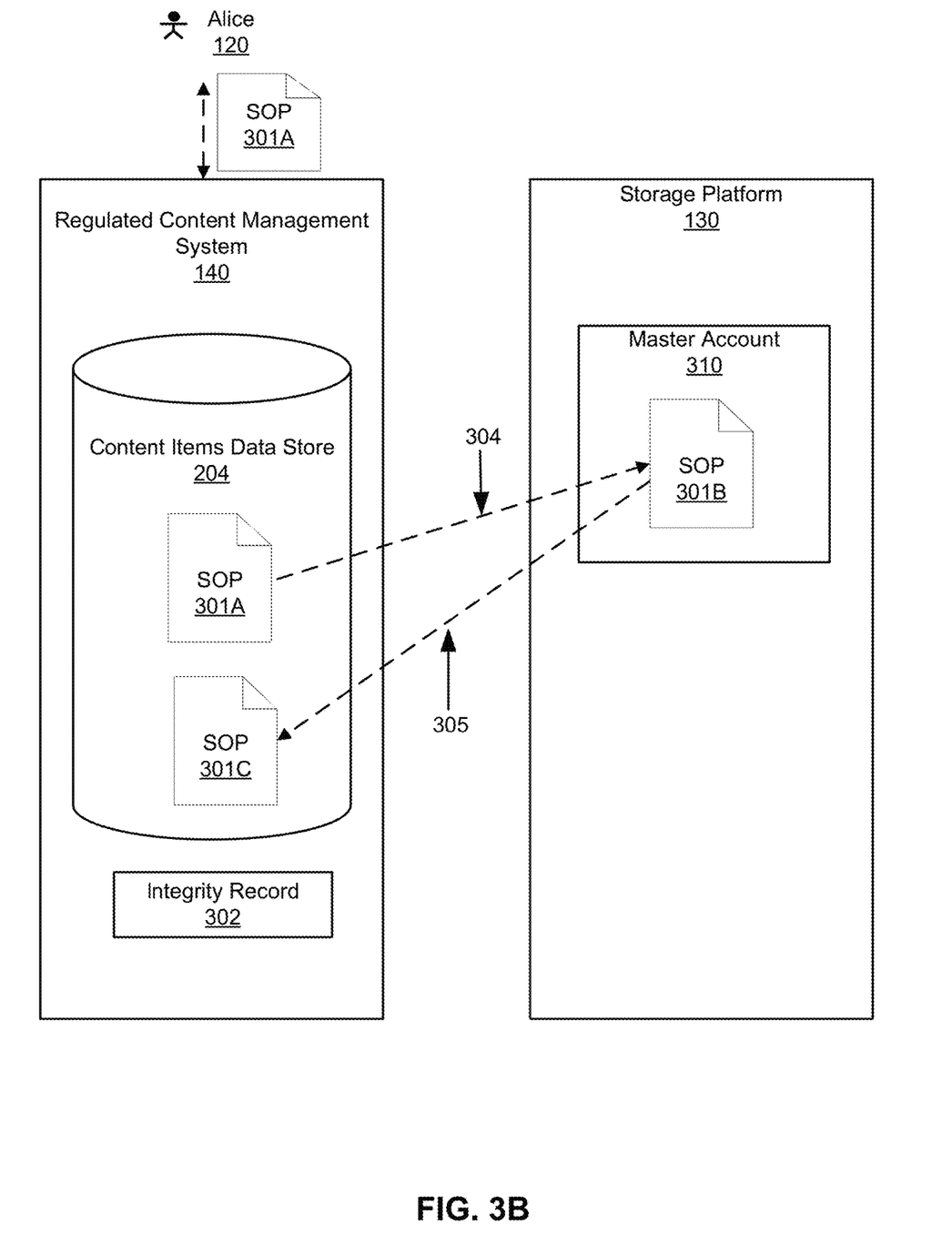
FIG. 3B illustrates an example of a user creating and storing a regulated content item.

FIG. 3B illustrates an example of a user Alice creating and storing a regulated content item. Alice 120 interacts with the regulated content management system 140 to create a Standard Operating Procedure (SOP) document. The regulated content management system 140 creates the SOP 301A responsive to Alice's request and provides the SOP 301A to another user Elaine for approval. In addition, the regulated content management system 140 creates an integrity record 302 associated with the created SOP 301A. The integrity record 302 includes an integrity check calculated based on the content of the SOP 301A. The regulated content management system 140 provides 304 a copy 301B of the created SOP 301A to the storage platform 130 for storage. The storage platform stores the received copy SOP 301B in directories under the master account 310 for the regulated content management system 140. The regulated content management system 140 receives 305 the file name and the storage location of the SOP 301B that is stored on the storage platform 130. The regulated content management system 140 updates the integrity record 302 associated with the SOP 301A to include the file name and the storage location.

Subsequently, the regulated content management system 140 verifies the integrity of the SOP 301B stored on the storage platform 130. The regulated content management system 140 uses the file name and/or the storage location included in the integrity record 302 to retrieve a copy of the SOP 301B. The regulated content management system 140 stores the retrieved copy of the SOP 301C in the content items data store 204. The regulated content management system 140 calculates an integrity check using the retrieved copy of the SOP 301C and compares the calculated integrity check to the integrity check of the integrity record 302. Responsive to determining that the two integrity checks are identical, the regulated content management system 140 verifies the integrity of the SOP 301B and informs Alice 120 that the SOP is created and stored successfully. The regulated content management system 140 removes the copies of the SOP 301A, 301C from the content items data store 204. Responsive to determining that the two integrity checks are not identical, the regulated content management system 140 determines that the SOP 301B fails the integrity verification and informs Alice 120 accordingly. The regulated content management system 140 removes the copies of the SOP 301A, 301C from the content items data store 204 and also removes the copy of the SOP 301B from the storage platform 130.

Figure 4A:
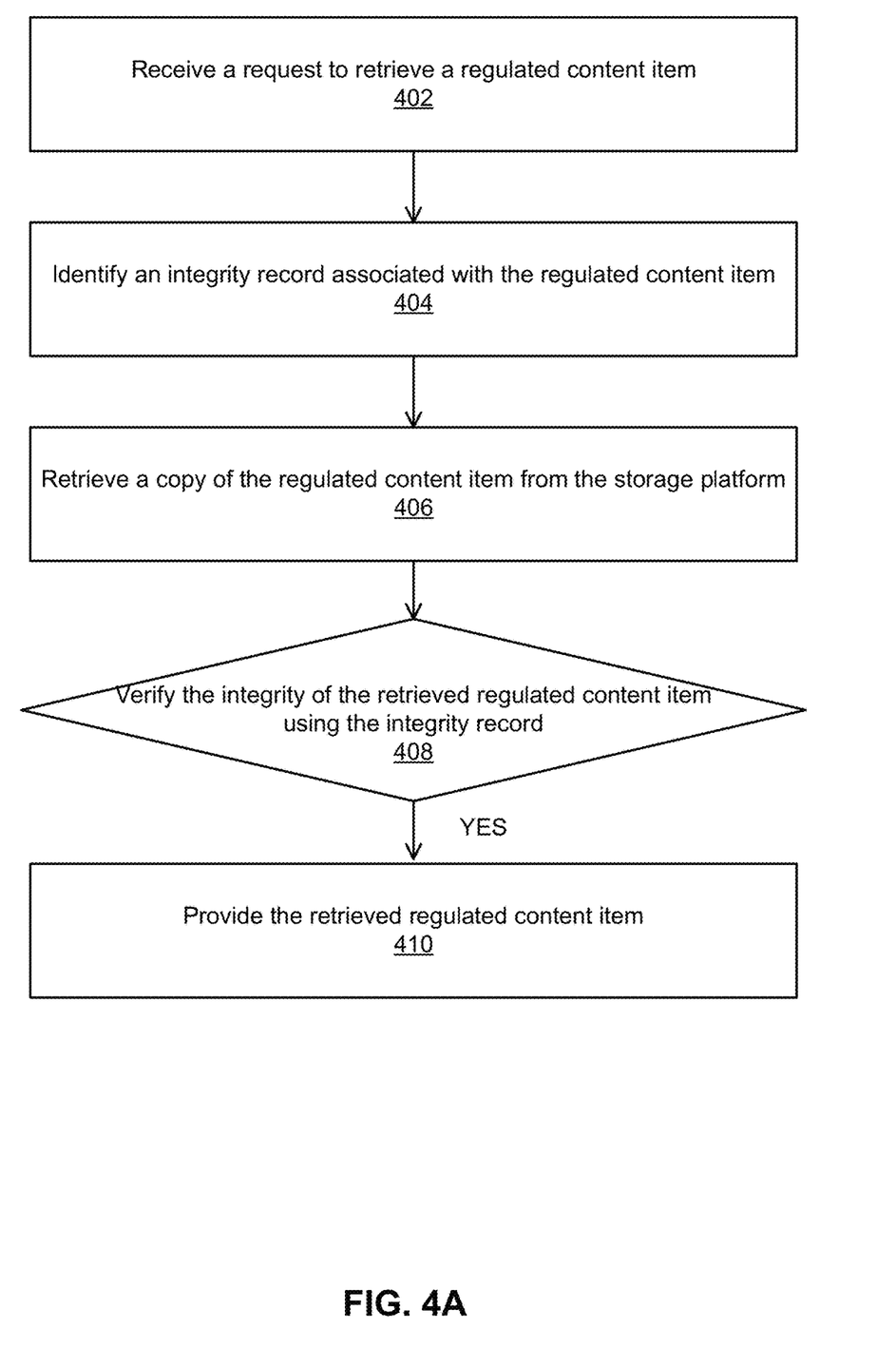
FIG. 4A is a flow chart illustrating an example process of retrieving a regulated content item, according to one embodiment.

FIG. 4A is a flow chart illustrating an example process of retrieving a regulated content item, according to one embodiment. The regulated content management system 140 receives 402 a request to retrieve a regulated content item. For example, the client interface module 212 receives a request from a user to retrieve a regulated content item. The user may request to retrieve a regulated content item using the particular content item's name. The user may also search for content items that match a search term and selects to retrieve a particular content item using a link directed to the content item. The regulated content management system 140 identifies 404 an integrity record associated with the regulated content item. For example, the regulated content management system 140 queries all integrity records using the regulated content item ID to locate the integrity record associated with the particular regulated content item that is requested by the user.

The regulated content management system 140 retrieves 406 a copy of the regulated content item from the storage platform 130, based on the integrity record. As the integrity record includes the storage location of the regulated content item being stored in the storage platform 130, the regulated content management system 140 uses the storage location to retrieve a copy of the regulated content item requested by the user. The regulated content management system 140 may store the retrieved copy temporarily.

The regulated content management system 140 verifies 408 the integrity of the retrieved regulated content item using the integrity record. The regulated content management system 140 determines an integrity check using the retrieved regulated content item and compares the determined integrity check to the integrity check of the integrity record associated with the regulated content item. Responsive to determining that the two integrity checks are identical, the regulated content management system 140 confirms the integrity of the stored regulated content item. The regulated content management system 140 provides 410 the retrieved regulated content item to the user. The regulated content management system 140 may remove the retrieved copy of the regulated content that is on the regulated content management system 140. Responsive to determining that the two integrity checks are different, the regulated content management system 140 determines the integrity verification of the retrieved regulate content has failed. The regulated content management system 140 notifies the user accordingly that the regulated content item was not retrieved successfully. The regulated content management system 140 removes the retrieved copy of the regulated content item.

Figure 4B:
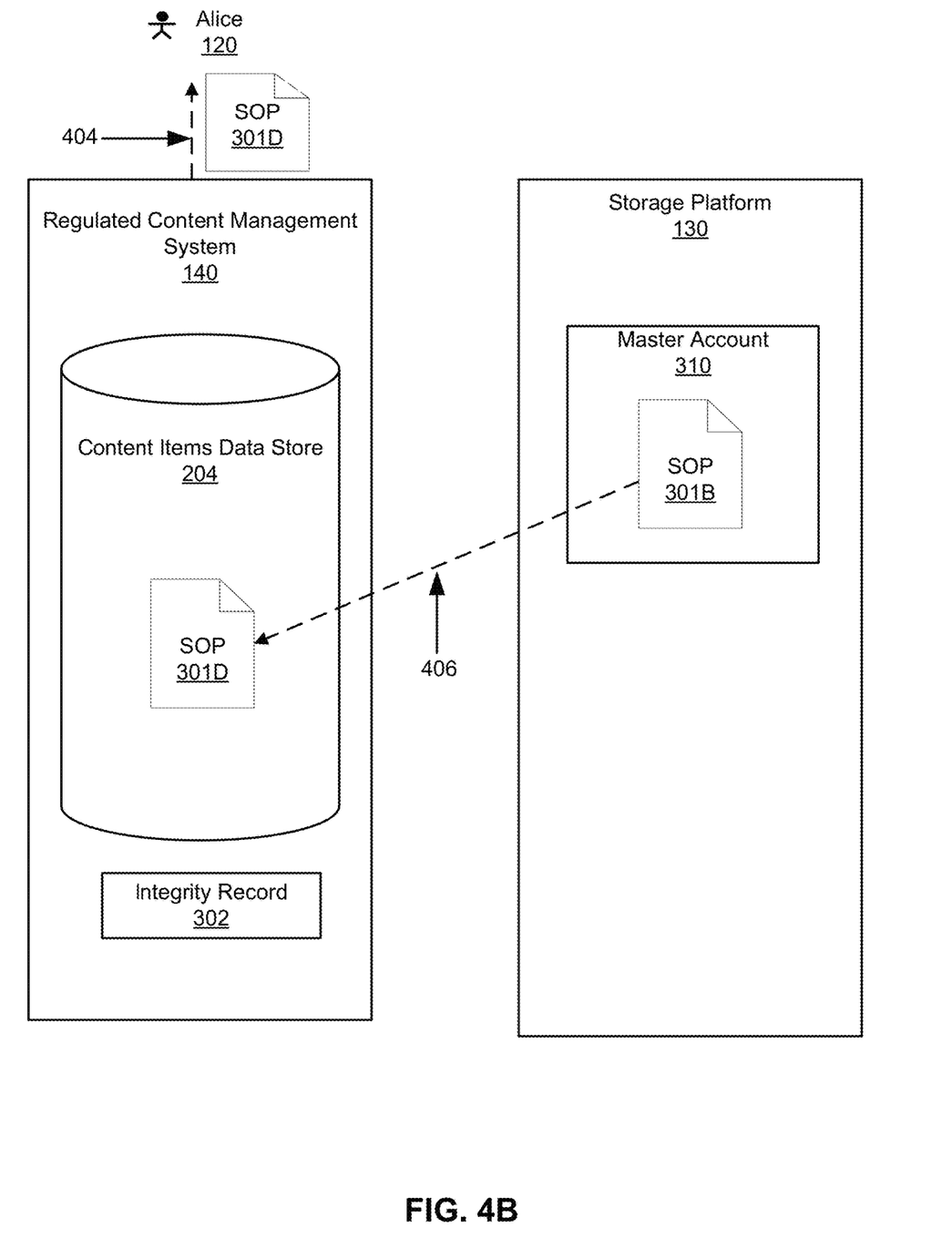
FIG. 4B illustrates an example of a user retrieving a regulated content item.

FIG. 4B illustrates an example of a user Alice retrieving a regulated content item. Continuing with the example illustrated in FIG. 3B, Alice 120 now requests to retrieve the SOP that is created and stored on the storage platform 130. Alice 120 may provide the storage location of the SOP 301B on the storage platform 130 to the regulated content management system 140. Alternatively, Alice 120 may provide the content item ID of the storage location of the SOP 301B to the regulated content management system 140, which identifies the storage location stored in the integrity record 302 associated with the SOP. The regulated content management system 140 retrieves 406 a copy of the SOP 301B from the storage platform 130 using the storage location. The regulated content management system 140 stores the retrieved copy of the SOP 301D in the content items data store 204. The regulated content management system 140 verifies the integrity of the retrieved copy of the SOP 301D. The regulated content management system 140 calculates an integrity check using the retrieved copy of the SOP 301D and compares the calculated integrity check to the integrity check of the integrity record 302. Responsive to determining that the two integrity checks are identical, the regulated content management system 140 verifies the integrity of the SOP 301D and informs Alice 120 that the SOP is retrieved successfully. The regulated content management system 140 provides 404 the retrieved copy of the SOP 301D to Alice 120. The regulated content management system 140 removes the copy of the SOP 301D from the content items data store 204. Responsive to determining that the two integrity checks are not identical, the regulated content management system 140 determines that the SOP 301B has failed the integrity verification and informs Alice 120 that the integrity of the SOP fails to be verified. The regulated content management system 140 removes the copy of the SOP 301D from the content items data store 204.

In many cases, enterprises 110 and users 120 use the storage platform 130 to store both regulated and non-regulated content items. To facilitate ease of use in accessing and managing both regulated and non-regulated content items, the regulated content management system 140 creates and provides representations of the regulated content items to the storage platform 130. As such, users may search for regulated content items stored on the storage platform 130, for example, using a search engine native to the storage platform 130. In addition, users may be directed to the regulated content management system 140 to access the regulated content items to ensure that the regulated content items are managed according to regulations. Accordingly, enterprises and users have the flexibility and convenience of managing both regulated and non-regulated content items using the storage platform 130 as all files are stored on the storage platform 130. It is also convenient and cheaper for those enterprises and users that currently use the storage platform 130 but not yet the regulated content management system 140 to start using the regulated content management system 140 to facilitate managing regulated content items without complicated data and system migrations.

Figure 5A:
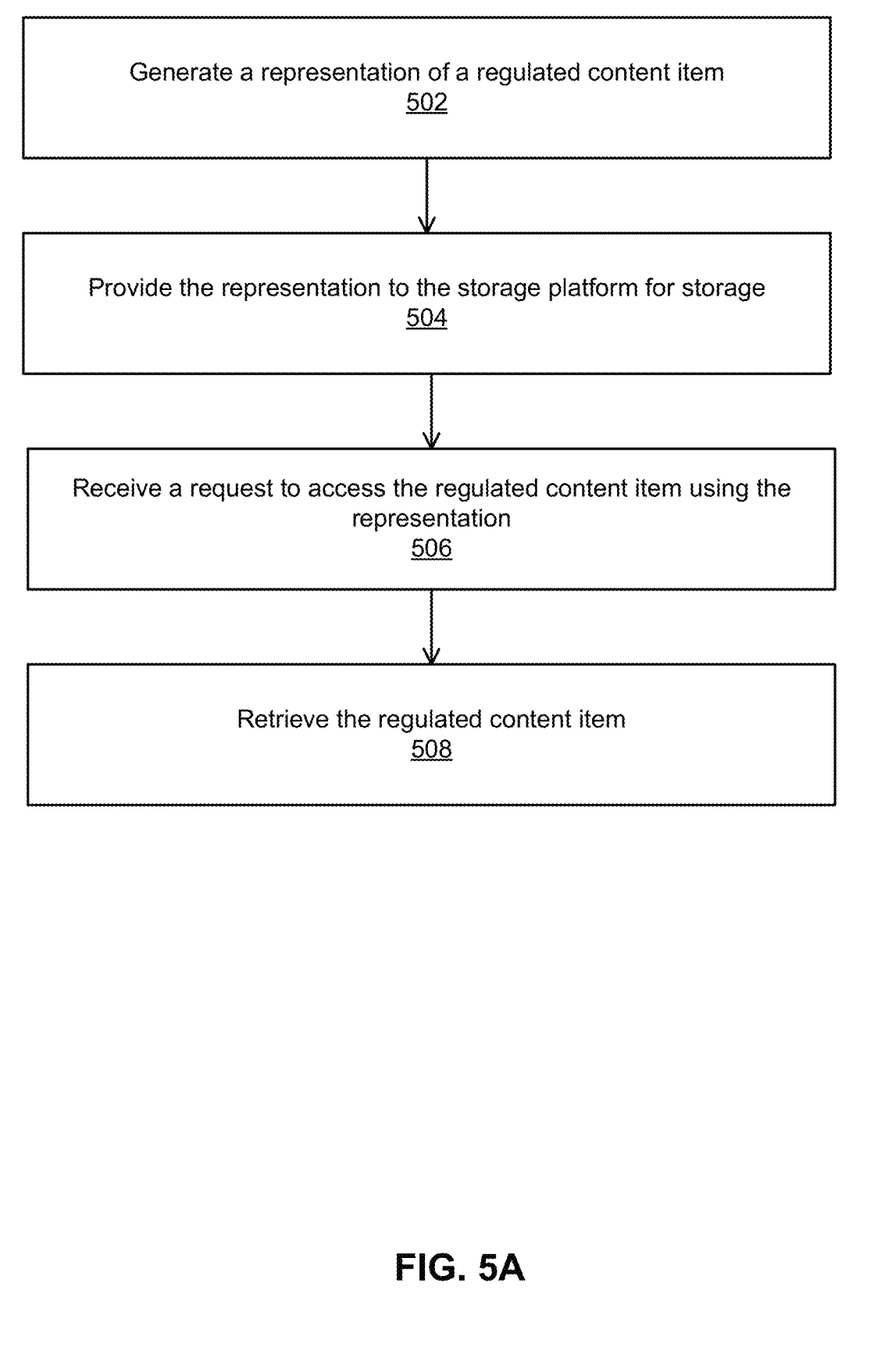
FIG. 5A is a flow chart illustrating an example process of using representations of regulated content items to facilitate content sharing between a regulated content management system and a storage platform.

FIG. 5A is a flow chart illustrating an example process of using representations of regulated content items to facilitate content sharing between the regulated content management system 140 and the storage platform 130. The regulated content management system 140 generates 502 a representation of a regulated content item. The representation of the regulated content item represents content of the regulated content item without revealing the actual content. The representation may include one or more keywords and/or phrases based on the content of the regulated content item, such as a scope, title, vendor, or date. The keywords and/or phrases can be extracted from the content of the regulated content item. The keywords and/or phrases may also be extracted from a log associated with the regulated content item. The representation may include a description of the content of the regulated content item, such as a topic, a structure (e.g., number of pages, sections, table of contents, etc.), a name or information about the creator, authorization information such as users authorized to access or edit the document, certain codes or identifiers of the document, and the like. For example, a description includes a name of a pharmaceutical drug that is a topic of a document, a table of contents of the document, and the user ID of the user who created the document. In one embodiment, representations of regulated content items include an image of the regulated content item. The image includes a portion of the content of the regulated content item that is permitted by various regulations to be accessed by users on the storage platform 130. The image is associated with metadata such as keywords and phrases generated based on the content of the regulated content item. In one embodiment, representations of regulated content items may further include links to the regulated content items.

The regulated content management system 140 may create the representation of the regulated content item based on a particular user's access control to the regulated content item. For a particular content item, different representations may be created for different users because they may have different access controls. For example, a first user Bob is permitted to view and edit part A of a regulated form, a second user Clara is permitted to view and edit part B of the regulated form, and a third user Doug is permitted to view and edit the entire regulated form. The representations of the regulated form created for Bob and Clara include keywords extracted from the parts A and B of the regulated form, respectively. The representation of the regulated form created for Doug includes keywords extracted from the entire regulated form. The regulated content item management system 140 may generate the representation responsive to receiving an approval from a user 120.

The regulated content management system 140 provides 504 the representation to the storage platform 130 for storage. The regulated content item and the representation may be stored at different directories on the storage platform 130. For example, the regulated content item is stored at a directory under the master account for the regulated content management system 140, and the representation is stored at a directory under the user's account. Because the representation of the regulated content item includes descriptions generated based on the regulated content item, a user can search for the regulated content item on the storage platform 130 using the representation of the regulated content item. The storage platform 130 queries the search term received from the user and provides the representation of the regulated content item to the user responsive to determining that one or more keywords included in the representation match the search term. The user may use the link included in the representation to request access the regulated content item.

The regulated content management system 140 receives the user's request to access the regulated content item using the representation. For example, the storage platform interface module 210 interfaces with the API of the storage platform 130 and receives the request to access the regulated content item responsive to the link being referenced. The regulated content item retrieves 508 the regulated content item, as described with respect to FIGS. 4A-4B.

Figure 5B:
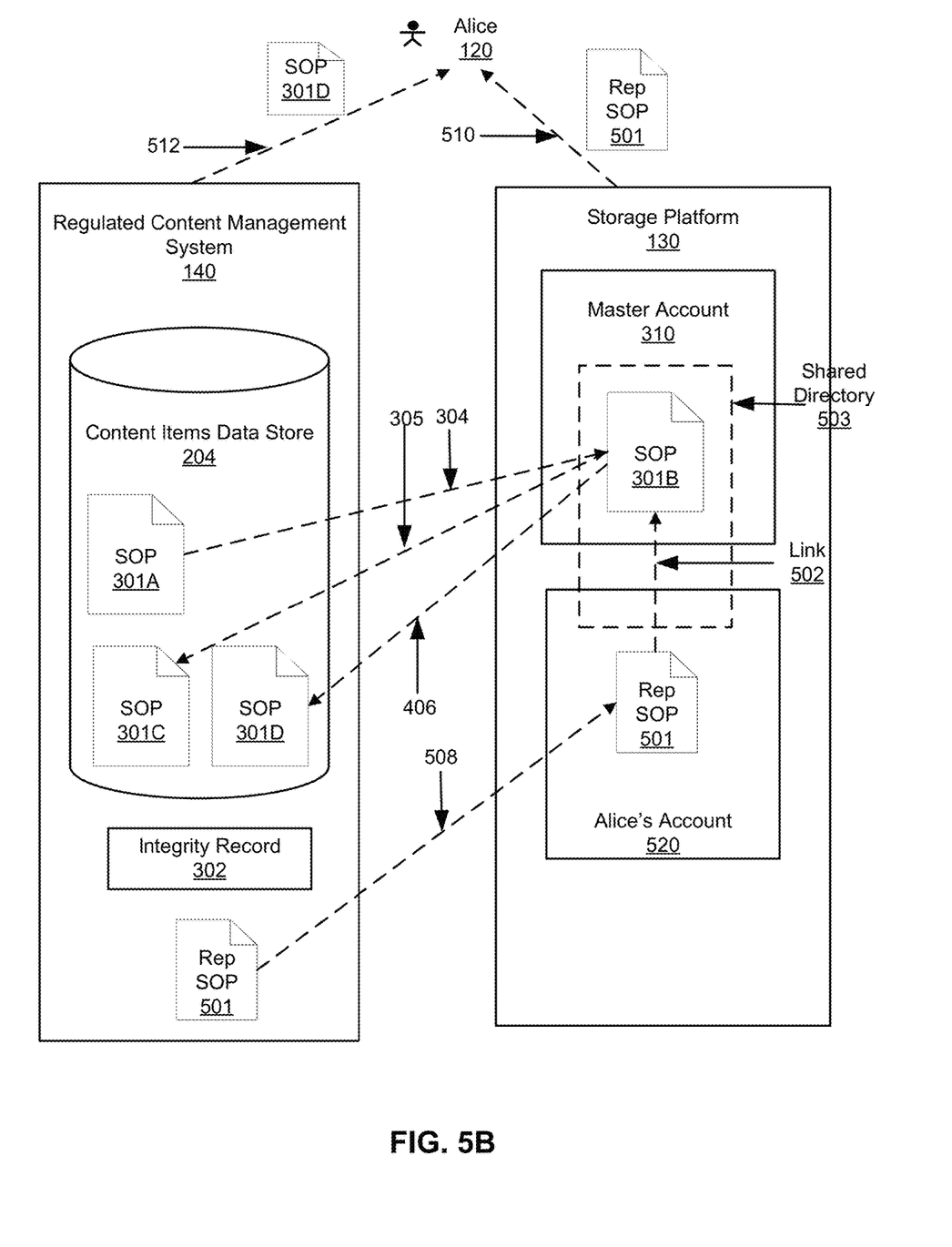
FIG. 5B illustrates an example of a user accessing a regulated content item on the storage platform.

FIG. 5B illustrates an example of a user Alice accessing a regulated content item on the storage platform 130. Continuing with the examples illustrated in FIGS. 3B and 4B, when Elaine approves the SOP 301A, the regulated content management system 140 creates a representation 501 of the SOP 301A. The representation 501 of the SOP 301A includes a link 502 to the SOP 301A. The regulated content management system 140 provides 508 the representation 501 of the SOP 301A to the storage platform 130 for storage. The representation 501 is stored at a directory under Alice's account 520 on the storage platform 130. Under the master account 310 for the storage regulated content management system 140, there are many directories for storing regulated content items for various users. A directory that stores regulated content items for a particular user may be shared with the user's account on the storage platform such that links to the regulated content items can be used but the regulated content items cannot be accessed on the storage platform 130. Users can search for a particular content item and determine an existence of the particular content item being stored on the storage platform 130 but users cannot access the particular content item on the storage platform 130.

Alice 120 may search for SOP 301B on the storage platform 130. The storage platform 130 provides 510 the representation 501 of the SOP to Alice 120 for review. Alice 120 can request to retrieve the SOP 301B by clicking on the link 502. Responsive to receiving the request, the regulated content management system 140 retrieves 406 a copy 301D of the SOP 301B, validates the integrity of the copy 301D of the SOP 301B, and provides the retrieved copy 301D to Alice 120 for review and access. The regulated content management system 140 may prompt Alice 120 to log into the regulated content management system 140 responsive to determining that Alice 120 is not logged in.

Figure 6:
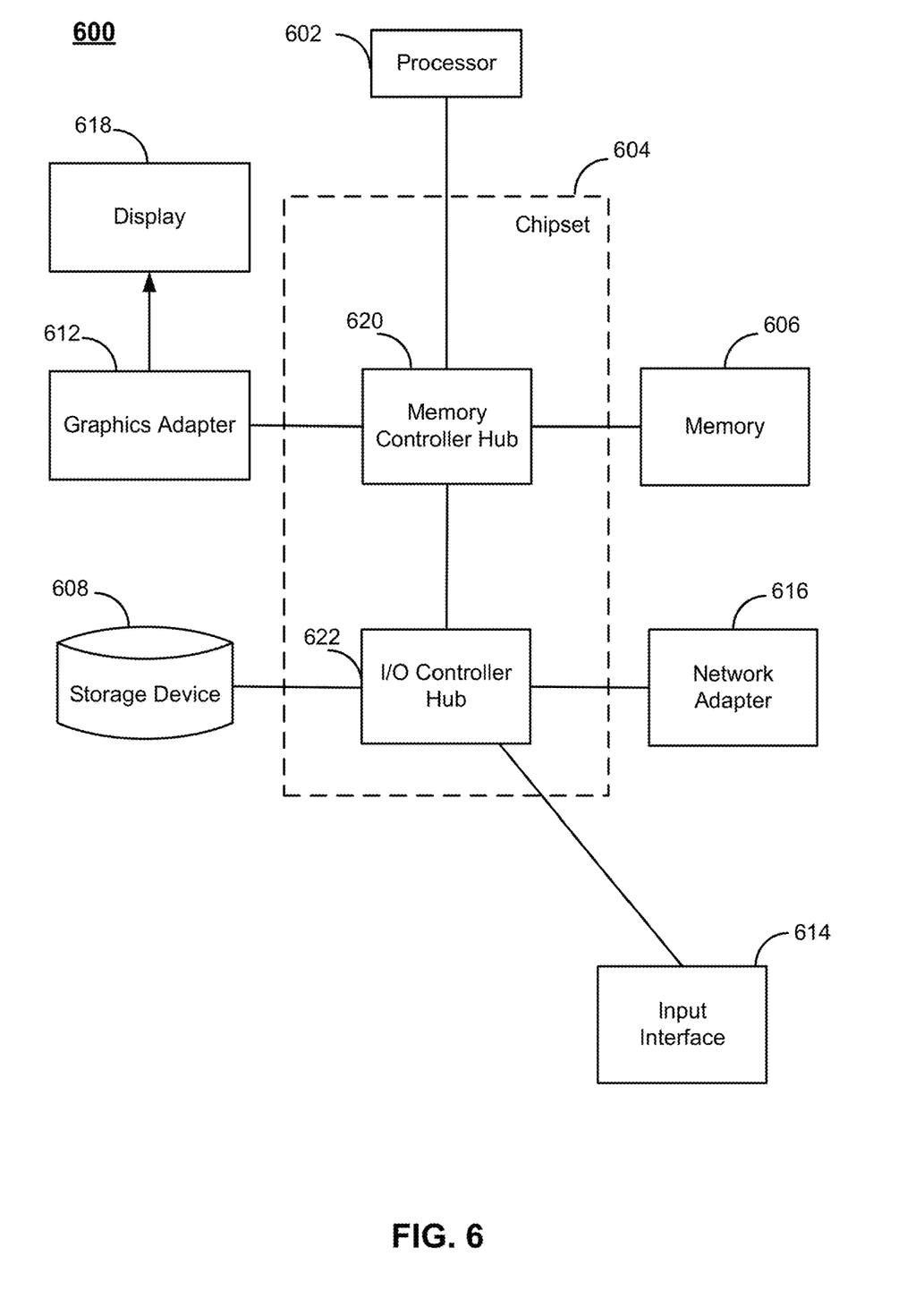
FIG. 6 is a high-level block diagram illustrating an example computer for implementing the entities shown in FIG. 1.

Turning now to a discussion of the implementation the regulated content management system 140, FIG. 6 is a high-level block diagram illustrating an example computer 600 for implementing the entities shown in FIG. 1. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. For example, the regulated content item management system 140 can run in a single computer 600 or multiple computers 600 communicating with each other through a network such as in a server farm. The computers 600 can lack some of the components described above, such as graphics adapters 612, and displays 618.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for storing and managing regulated content items on non-regulated storage platforms. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for storing and managing regulated content items on a non-regulated storage platform, comprising:
   receiving, at a regulated content management system, a request to create a regulated content item from a user device corresponding to a first user, content of the regulated content item subject to one or more regulations;
   creating, at the regulated content management system, the regulated content item;
   creating, at the regulated content management system, an integrity record associated with the regulated content item based on the content of the regulated content item;
   storing, at the regulated content management system, the integrity record;
   providing, by the regulated content management system, the regulated content item to the non-regulated storage platform for storage; and
   in response to the non-regulated storage platform storing the regulated content item, verifying, by the regulated content management system, an integrity of the regulated content item stored on the non-regulated storage platform based at least in part on the integrity record,
   wherein the regulated content item is stored on the non-regulated storage platform and only directly accessible by the regulated content management system, and wherein non-regulated content items that are not subject to the one or more regulations and that are stored on the non-regulated storage platform are directly accessible by the user device.

2. The computer-implemented method of claim 1, wherein the creating the integrity record comprises calculating a first integrity check associated with the regulated content item based on the content of the regulated content item.

3. The computer-implemented method of claim 2, wherein the verifying the integrity of the regulated content item comprises:
   retrieving a copy of the regulated content item stored on the non-regulated storage platform;
   calculating a second integrity check based on content of the retrieved copy of the regulated content item;
   comparing the first integrity check to the second integrity check; and
   responsive to determining that the first integrity check and the second integrity check are identical, confirming the integrity of the regulated content item stored on the non-regulated storage platform.

4. The computer-implemented method of claim 2, wherein the first integrity check is a checksum and the calculating the first integrity check associated with the regulated content item comprises hashing the content of the regulated content item.

5. The computer-implemented method of claim 1, further comprising:
   receiving, from the non-regulated storage platform, at least one of a file name of and a storage location of the regulated content item stored on the non-regulated storage platform; and
   updating the integrity record to include the at least one of the file name of and the storage location of the regulated content item.

6. The computer-implemented method of claim 1, further comprising:
   receiving, from a second user device corresponding to a second user, a request to retrieve the regulated content item;
   retrieving a copy of the regulated content item from the non-regulated storage platform;
   verifying the integrity of the retrieved regulated content item based on the integrity record; and
   providing the retrieved regulated content item to the second user responsive to confirming the integrity of the retrieved regulated content item.

7. The computer-implemented method of claim 6, wherein the integrity record comprises a first integrity check and the verifying the integrity of the retrieved regulated content item comprises:
   calculating a second integrity check based on content of the retrieved copy of the regulated content item;
   comparing the first integrity check to the second integrity check; and
   responsive to determining that the first integrity check and the second integrity check are identical, confirming the integrity of the regulated content item stored on the non-regulated storage platform.

8. The computer-implemented method of claim 7, wherein the first integrity check is a checksum, the calculating the first integrity check associated with the regulated content item comprises hashing the content of the regulated content item according to a hashing algorithm, and the calculating the second integrity check comprise hashing the content of the retrieved copy of the regulated content item according to the hashing algorithm.

9. The computer-implemented method of claim 6, wherein the integrity record comprises a regulated content item ID and a storage location, further comprising:
   identifying the integrity record associated with the regulated content item according to the regulated content item ID associated with the regulated content item; and
   interfacing with the non-regulated storage platform according to the storage location to retrieve the copy of the regulated content item stored on the non-regulated storage platform.

10. The computer-implemented method of claim 1, further comprising providing the regulated content item to a second user device corresponding to a second user for approval.

11. A regulated content management system for storing and managing regulated content items on a non-regulated storage platform, comprising:
   a processor for executing computer program instructions; and
   a non-transitory computer-readable storage medium comprising computer program instructions executable by the processor, the computer program instructions comprising:

instructions for receiving, from a user device corresponding to a first user, a request to create a regulated content item, content of the regulated content item subject to one or more regulations;

instructions for creating the regulated content item;

instructions for creating an integrity record associated with the regulated content item based on the content of the regulated content item;

instructions for storing the integrity record at the regulated content management system;

instructions for providing the regulated content item to the non-regulated storage platform for storage, the non-regulated storage platform separate from the regulated content management system; and instructions for in response to the non-regulated storage platform storing the regulated content item, verifying an integrity of the regulated content item stored on the non-regulated storage platform based at least in part on the integrity record, wherein the regulated content item is stored on the non-regulated storage platform and only directly accessible by the regulated content management system, and wherein non-regulated content items that are not subject to the one or more regulations and that are stored on the non-regulated storage platform are directly accessible by the user device.

12. The system of claim 11, wherein the creating the integrity record comprises calculating a first integrity check associated with the regulated content item based on the content of the regulated content item.

13. The system of claim 12, wherein the verifying the integrity of the regulated content item comprises:

retrieving a copy of the regulated content item stored on the non-regulated storage platform;

calculating a second integrity check based on content of the retrieved copy of the regulated content item;

comparing the first integrity check to the second integrity check; and responsive to determining that the first integrity check and the second integrity check are identical, confirming the integrity of the regulated content item stored on the non-regulated storage platform.

14. The system of claim 12, wherein the first integrity check is a checksum and the calculating the first integrity check associated with the regulated content item comprises hashing the content of the regulated content item.

15. The system of claim 11, wherein the computer program instructions further comprise:

instructions for receiving, from the non-regulated storage platform, at least one of a file name of and a storage location of the regulated content item stored on the non-regulated storage platform; and instructions for updating the integrity record to include the at least one of the file name of and the storage location of the regulated content item.

16. The system of claim 11, wherein the computer program instructions further comprise:

instructions for receiving, from a second user device corresponding to a second user, a request to retrieve the regulated content item;

instructions for retrieving a copy of the regulated content item from the non-regulated storage platform;

instructions for verifying the integrity of the retrieved regulated content item based on the integrity record; and instructions for providing the retrieved regulated content item to the second user responsive to confirming the integrity of the retrieved regulated content item.

17. The system of claim 16, wherein the integrity record comprises a first integrity check and the verifying the integrity of the retrieved regulated content item comprises:

calculating a second integrity check based on content of the retrieved copy of the regulated content item;

comparing the first integrity check to the second integrity check; and responsive to determining that the first integrity check and the second integrity check are identical, confirming the integrity of the regulated content item stored on the non-regulated storage platform.

18. The system of claim 17, wherein the first integrity check is a checksum, the calculating the first integrity check associated with the regulated content item comprises hashing the content of the regulated content item according to a hashing algorithm, and the calculating the second integrity check comprise hashing the content of the retrieved copy of the regulated content item according to the hashing algorithm.

19. The system of claim 16, wherein the integrity record comprises a regulated content item ID and a storage location, and wherein the computer program instructions further comprise:

instructions for identifying the integrity record associated with the regulated content item according to the regulated content item ID associated with the regulated content item; and instructions for interfacing with the non-regulated storage platform according to the storage location to retrieve the copy of the regulated content item stored on the non-regulated storage platform.

20. A non-transitory computer-readable storage medium comprising computer program instructions executable by a processor of a regulated content management system, the computer program instructions for:

receiving, from a user device of a first user, a request to create a regulated content item, content of the regulated content item subject to one or more regulations;

creating the regulated content item;

creating an integrity record associated with the regulated content item based on the content of the regulated content item;

storing the integrity record at the regulated content management system;

providing the regulated content item to a non-regulated storage platform for storage, the non-regulated storage platform separate from the regulated content management system; and verifying an integrity of the regulated content item stored on the non-regulated storage platform based at least in part on the integrity record, wherein the regulated content item is stored on the non-regulated storage platform and only directly accessible by the regulated content management system, and wherein non-regulated content items that are not subject to the one or more regulations and that are stored on the non-regulated storage platform are directly accessible by the user device.

* * * * *